United States Patent [19]

Ohba et al.

[11] Patent Number: 5,289,517
[45] Date of Patent: Feb. 22, 1994

[54] DIGITAL PULSE PROCESSING DEVICE

[75] Inventors: Mamoru Ohba, Hitachi; Mitsuru Watabe, Katsuta; Rika Minami, Hitachi; Sanshiro Obara, Ibaraki, all of Japan

[73] Assignee: Hitachi, Ltd., Chiyoda, Japan

[21] Appl. No.: 757,139

[22] Filed: Sep. 10, 1991

[30] Foreign Application Priority Data

Sep. 10, 1990 [JP] Japan .................................. 2-239742

[51] Int. Cl.[5] .............................................. H03L 7/00
[52] U.S. Cl. .................................... 377/44; 377/24.1; 377/51; 377/106; 377/107
[58] Field of Search ................. 377/24.1, 44, 51, 106, 377/107

[56] References Cited

U.S. PATENT DOCUMENTS

| | | | |
|---|---|---|---|
| 3,832,640 | 8/1974 | Cederquist et al. | 377/51 |
| 4,143,327 | 3/1979 | Welsh | 377/107 |
| 4,216,530 | 8/1980 | Yamaki et al. | 377/24.1 |
| 4,251,722 | 2/1981 | Veutier | 377/51 |
| 4,277,693 | 7/1981 | Hoekman | 377/44 |
| 4,486,890 | 12/1984 | Hammes | 377/24.1 |
| 4,501,005 | 2/1985 | Miller | 377/24.1 |
| 4,633,183 | 12/1986 | Heatherington | 377/44 |
| 4,663,770 | 5/1987 | Murray et al. | 377/24.1 |
| 4,912,734 | 3/1990 | Frauenglass | 377/44 |
| 5,020,082 | 5/1991 | Takeda | 377/44 |

FOREIGN PATENT DOCUMENTS

| | | | |
|---|---|---|---|
| 0343352 | 11/1989 | European Pat. Off. | G01P 3/489 |
| 59-100866 | 10/1984 | Japan . | |
| 60-159657 | 12/1985 | Japan . | |

OTHER PUBLICATIONS

*Messen Pruten Automatisieren*, by G. A. Spescha, "Ein Schnelles Digitales Drehzahlmessgerat", vol. 22, No. 10, Oct. 1986.

*IBM Technical Disclosure Bulletin*, by B. J. Blevins, "Digital Tachometer with Scaling", vol. 25, No. 4, Sep. 1982, New York.

*Primary Examiner*—William L. Sikes
*Assistant Examiner*—Scott A. Ouellette
*Attorney, Agent, or Firm*—Antonelli, Terry, Stout & Kraus

[57] ABSTRACT

A digital pulse processing device is capable of selecting desired precision. The digital pulse processing device includes a counter group for counting pulses output from a pulse output device, the counter group having a plurality of counters A and B that can be separated from and coupled with each other, a mode control circuit for instructing separation and coupling of the counters A and B, and a control circuit for separating and coupling the counters A and B in accordance with the instruction of the mode control circuit. An overflow condition of the free-run counter B is detected using an overflow flag. Detection of an overflow is conducted by setting the flag when an overflow condition has occurred twice or more. The flag is reset by rewriting the state of the flag by a software. An overflow condition which has occurred for the first time is detected in the conventional manner and is treated as carry or borrow. A register is provided to hold the value of the counter B when a microcomputer reads in the counter B. In this way, even when $\Delta A(i)=0$, speed detection operation can be executed using the value of the counter B obtained synchronously with the counting of the counter A.

20 Claims, 5 Drawing Sheets

1

DIGITAL PULSE PROCESSING DEVICE

BACKGROUND OF THE INVENTION

1. Field of the Invention

The present invention relates to a digital pulse processing device suitable for use to preprocess a detection signal representing the speed of a moving or rotating body before it is supplied to a digital motor speed control device.

2. Description of the Related Art

The pulse processing function of conventional speed detection devices is disclosed in, for example, Japanese Patent Laid-open No. Sho59-100866. This pulse processing function of the speed detection device includes a first counter A for counting a pulse train output from a pulse generator, a second counter B for counting clock pulses having a fixed higher frequency than the pulse train, and a latch for storing the count of the second counter B. This speed detection device is implemented by hardware designed to store the counted value of the clock pulses of the second counter B each time a pulse is output from the pulse generator.

In the above-described speed detecting device, counting of the pulses from the pulse generator and counting of clock pulses are synchronized so as to achieve accurate speed detection. The speed detection operation carried out is to obtain a speed detection value Nt by executing the following expression using the pulse counted value A (i) of the first counter A, a latched value B (i) of the second counter B, the values A and B being obtained at the present reading in of a microcomputer, and the values A (i−1) and B (i−1) obtained by the previous reading in of the microcomputer:

$$N_t = K \cdot \Delta A(i)/\Delta B(i)$$
$$= K \cdot \{A(i) - A(i-1)\}/\{B(i) - B(i-1)\}$$

where K is a constant, $\Delta A$ is a change in the first counter A, and $\Delta B$ is a change in the second counter B.

When the motor is rotating at a low speed, the pulse width of the pulses output from the pulse generator is large, and the counted value of the pulses may not change in the microcomputer's reading-in intervals which is generally several msec. At that time, $\Delta A$ (i)=1, and $\Delta B$ (i)=0, and the speed detection operation is impossible.

To overcome this problem, in the aforementioned conventional technique, a RD (read) signal is output from the microcomputer by the software. When the speed detecting device receives this RD signal, it forcibly stores the counted value of the clock pulses in the latch asynchronously with the counting of the pulse output device. In that case, the speed detection operation is executed using the previously obtained values of $\Delta A$ (i) and $\Delta B$ (i) obtained by subtracting the previously obtained clock pulses counted value from the clock pulses counted values latched by the RD signal.

Regarding a subsequent reading-in of the microcomputer, if no pulse is output from the pulse output device, $\Delta A$ (i) is that used in the previous operation, and $\Delta B$ (i) is the value obtained by adding to the previous $\Delta B$ (i) the value obtained by subtracting the previously read in clock pulse counted value from the clock pulse counted value latched by the RD signal. Therefore, $\Delta B$ (i) is the value obtained between the last pulse output from the pulse generator and the present reading-in presently read value of the microcomputer.

In the aforementioned conventional technique, when $\Delta A$ (i)=0, the speed detection operation requires complicated processings, the such as branch processing, output of a RD signal and cumulative addition of $\Delta B$ (i), which increase the burden on the software.

Furthermore, no consideration is given to the precision of the latch for storing the counted values A (i) and B (i) of the counter for counting the pulses of the pulse generator and the counter for counting the clock pulses. That is, since the number of bits for the latch is fixed, the precision is also fixed. Consequently, a higher precision than required is obtained for a certain application, while an insufficient precision is obtained for another application. As a result, the conventional latching is not versatile, and pulse processing cannot be achieved over a wide range of precision.

Furthermore, no consideration is given to the overflow of the counter B (i) for counting the clock pulses. That is, although $\Delta B$ (i) can be obtained when an overflow condition occurs in the counter B (i) once, if an overflow condition occurs more than once, it is impossible to obtain an accurate $\Delta B$ (i) because there is no function of checking the number of times the overflow condition occurs. This makes accurate speed detection impossible.

SUMMARY OF THE INVENTION

An object of the present invention is to provide a digital pulse processing device which is capable of alleviating the burden on the software by detecting the value of a timer synchronously with a microcomputer's present read-out of data from a counter and by executing a speed detection operation by a simple process.

Another object of the present invention is to provide a digital pulse processing device which has a variable-precision type pulse processing function using a counter and a latch whose precision can be varied and which is capable of providing data having a required and sufficient precision for an accurate speed detection operation conducted by a microcomputer.

To achieve the above-described objects, the present invention provides a digital pulse processing device which is capable of selecting precision. The digital pulse processing device comprises a counter group for counting pulses output from a pulse output device, the counter group having a plurality of counters that can be separated from and coupled with each other, a mode control circuit for instructing separation and coupling of the counters, and a control circuit for separating and coupling the counters in accordance with the instruction of the mode control circuit.

When the counters are separated, the individual counters can be separately operated to separately process the pulses from a plurality of pulse output devices.

An overflow condition of the free-running counter B, which is one of the plurality of counters, is detected using an overflow flag. Detection of an overflow is conducted by setting the flag when an overflow condition has occurred twice or more. The flag is reset by rewriting the state of the flag by means of software. An overflow condition which has occurred for the first time is detected in the conventional manner and is treated as carry or borrow.

A register is provided to hold the value of the counter B obtained when a microcomputer reads the counter B. In this way, even when $\Delta A$ (i)=0, a speed detection operation can be executed using the value of the counter B obtained synchronously with the counting of the counter A.

In accordance with the present invention, the counter for counting the pulses from a pulse output device is made up of a pair of counters and a coupling control circuit thereof.

The counter is capable of counting up, down or counting up and down. Which counting method is employed is determined by a mode control register.

When the two counters are coupled with each other, the coupling control circuit outputs a carry or borrow signal of one of the counters to the remaining counter as a counting up or down signal.

When the two counters are separately operated, the pulses output from the pulse output device to one of the counters are supplied to that counter through the coupling control circuit.

Thus, precision of the counters can be varied by checking for the presence or absence of a carry or borrow signal and by changing over the destination of the output pulses of the pulse output device. Furthermore, the counted value of the counter for counting clock pulses is stored in a latch corresponding to the counter by a selection circuit for selecting the latch in which the value is stored.

To detect that an overflow condition of the free-running counter for counting clock pulses has occurred twice or more, a flag is set on the basis of the results of a logical AND between a 1-bit latch for holding a carry obtained when an overflow occurs and a similar latch which is operated when the value of that latch is 1. The flag is reset by the software. When the flag is reset, the two latches are cleared.

When $\Delta MA = 0$ is obtained during the speed detection operation, the value of a timer obtained between the last pulse output from the pulse generator and the microcomputer's reading in of the data in the counter MB is detected. To accomplish the speed detection operation using this value of the timer with the least errors when $\Delta MA = 0$, a latch is provided to store the value of the counter MB obtained when the microcomputer reads out the data from the counter MA.

DETAILED DESCRIPTION OF THE PREFERRED EMBODIMENTS

An embodiment of the present invention will now be described with reference to the accompanying drawings.

Figure 1:
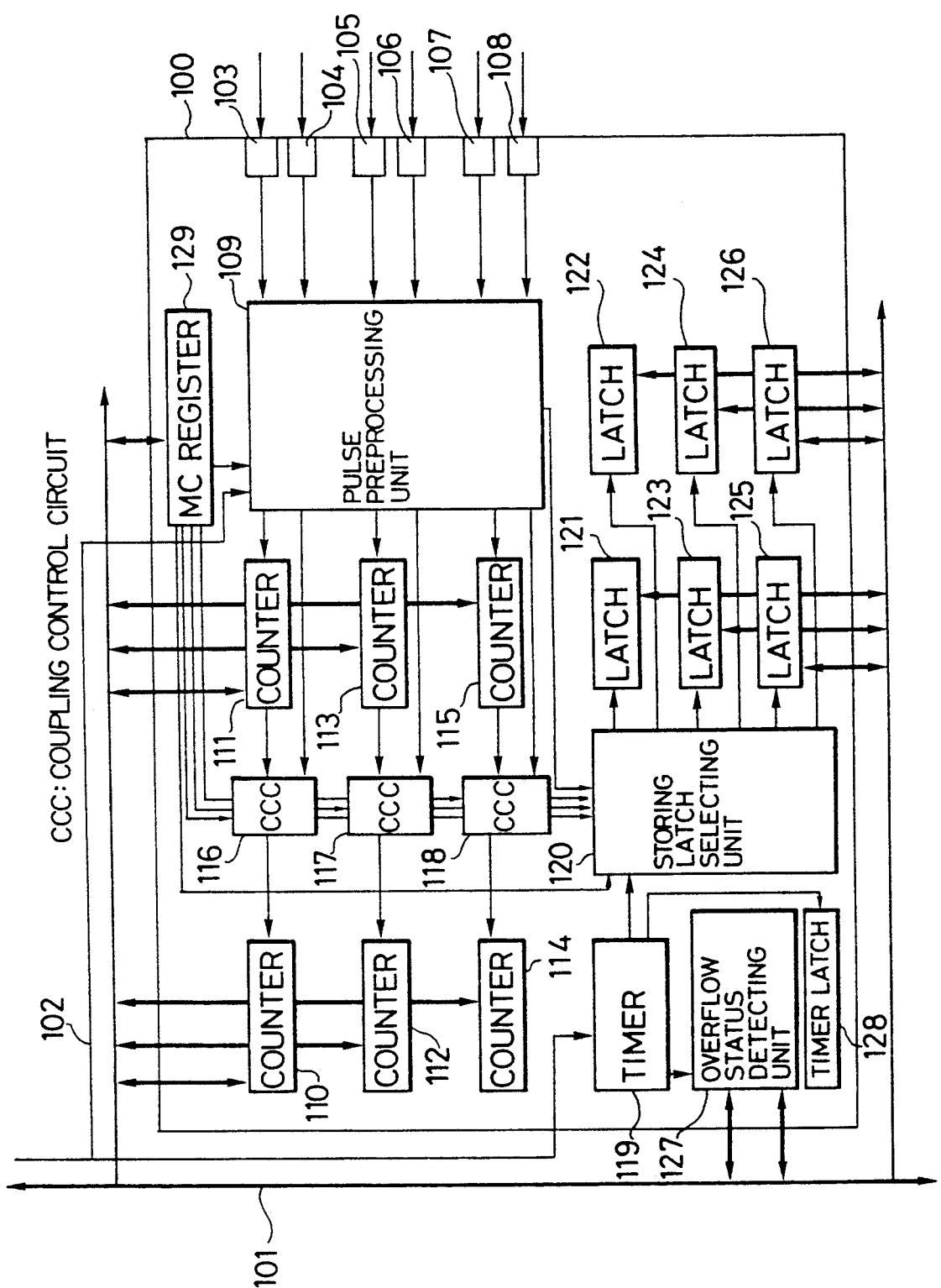
FIG. 1 is a block diagram of an embodiment of a digital pulse processing device according to the present invention.

FIG. 1 is a block diagram of an embodiment of a digital pulse processing device according to the present invention.

A pulse processing unit 100, which performs the pulse processing function according to the present invention, has the following configuration.

A data bus 101 is used to transmit data between a microcomputer (not shown) and the pulse processing unit 100 having the pulse processing function according to the present invention.

Clock pulses 102 are used to initiate actions within the microcomputer. They are also used to initiate actions within the pulse processing unit 100.

Pulses from pulse generators are received by input terminals 103 through 108. Input terminals 103 and 104 constitute channel 0, input terminals 105 and 106 form channel 1, and input terminals 107 and 108 are channel 2. There are three channels in total.

The pulse signal supplied to each channel is frequency multiplied and delivered to a counter as a count signal by a pulse preprocessing unit 109. Frequency multiplication is the processing in which the rising and falling edges of an input pulse are detected and a pulse signal is generated synchronously with the detected pulse. In this frequency multiplication processing, it is therefore possible to generate a pulse signal whose cycle is a submultiple (whose frequency is a multiple) of that of the pulse signal from the pulse generator. The generated pulses are supplied to counters 110 to 115 as either a counting up or counting down signal. Switch over between counting up and counting down signals is performed in accordance with the operation mode set in a mode control register 12900.

Counting of the counting up or counting down signal obtained by the pulse preprocessing unit 109 is conducted by 16-bit counters 110 to 115. Counters 110 and 111 count pulses input to the input terminals 103 and 104 which constitute channel 0.

The present invention is characterized in that these two counters can be selectively used separately or in a coupled state. Coupling of the counters is conducted on the data designated by the mode control register 129. Counters 112 and 113 or 114 and 115 have the same function as the counters 110 and 111, and count the pulses input to the input terminals 105 and 106 constituting channel 1 or the input terminals 107 and 108 constituting channel 2.

The separate or coupled use of the counters 110 and 111 is changed over by a coupling control circuit 116. Coupling control circuits 117 and 118 have the same function as the coupling control circuit 116, and operate to control separation and coupling of the counters 112 and 113, and 114 and 115, respectively, The counted value of a timer, 119 is stored in 16-bit latches 121 to 126. Latches 121 and 122 correspond to the counters 121 and 122. When the counters 110 and 111 are used in a coupled state, data having a double precision is obtained by the two latches 121 and 122. The latches 121 and 122 store the counted value of the timer 119 synchronously with the counting operation of the counters 110 and 111 which count a counting up or down signal output from the pulse preprocessing unit 109. Latches 123 and 124 or 125 and 126 have the same function as the latches 121 and 122, and respectively correspond to the counters 112 and 113, and 114 and 115.

Timer 119 counts the clock pulses 102 of a microcomputer which is not shown. The clock pulses are first divided by a value designated by the mode control register 129 and then counted.

A storing latch selecting unit 120 makes a selection of the latches 121 to 126 and thus determines the latch at which the data of the timer 119 is to be stored. The control signal sent from the pulse preprocessing unit 109 to the storing latch selecting unit 120 synchronizes counting of the pulses with latching of the timer data. This control signal is also used to indicate counting or non-counting of the counter to the storing latch selecting unit 120.

The mode control register 129 designates the operation mode of a pulse processing unit 100.

An overflow status detecting unit 127 contains a status register for memorizing that an overflow condition of the timer 119 has occurred twice or more before a subsequent reading-out of the latches 121 to 126. When this status register is set, an alarm indicating disability of an accurate speed detection operation is issued.

A timer latch 128 stores the value of the timer 119 when the microcomputer reads in the value in this latch 128.

Figure 2:
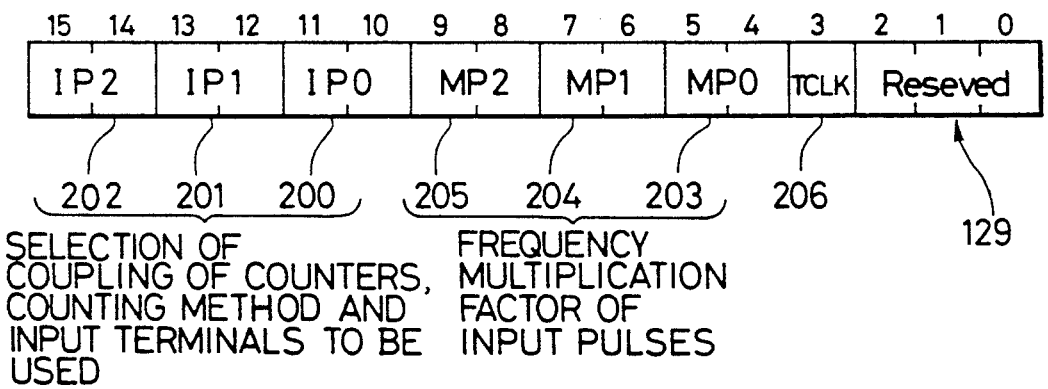
FIG. 2 shows a memory configuration of a mode control register MCREG.

FIG. 2 shows the bit configuration of a memory in the mode control register 129. This register 129 has a 16-bit structure. Among the 16 bits, bits 2, 1 and 0 are not used. Bits 15 to 10 are used for making selection on the input pulses: bits 11 and 10, constituting an IP0 portion 200, are used for selecting coupling or non-coupling of the counters for counting the pulses input from the channel 0, the counting method and the input terminal to be used; bits 13 and 12, constituting an IP1 portion 201, are used for selecting coupling or non-coupling of the counters for counting the pulses input from the channel 1, the counting method and the input terminal to be used; and bits 15 and 14, constituting an IP2 portion 202, are used for selecting coupling or non-coupling of the counters for counting the pulses input from the channel 2, the counting method and the input terminal to be used.

Allocation of the codes for the individual channels is in common and shown in Table 1. When a combination of the upper and lower bits is 00, the counters are not coupled, but are operated separately, and values are counted up in both counters. At that time, both PEA and PEB terminals are used to input pulses from the pulse output device. When a combination of the upper and lower bits is 01, the same operation is performed with the exception that values are counted down in the counters. When a combination of the upper and lower bits is 10, the counters are coupled, and an instruction indicating counting up or down is input to the PEA terminal while pulses are input to the PEB terminal. When a combination of the upper and lower bits is 11, the counters are coupled and two-phase pulses having a directional component are input to the PEA and PEB terminals. Therefore, counting up or down is performed in accordance with the directional component.

TABLE 1

| Code allocation for IP0 to 2 | | | | |
|---|---|---|---|---|
| Upper bit | Lower bit | Coupling | Counting method | Input Terminal |
| 0 | 0 | Not coupled | Counted up | PEA terminal PEB terminal |
| 0 | 1 | Not coupled | Counted down | PEA terminal PEB terminal |
| 1 | 0 | Coupled | When PEA terminal is 0: counted up When PEA terminal is 1: counted down | PEB terminal |
| 1 | 1 | Coupled | Normal rotation: counted up (*1) | PEA terminal |
|  |  |  | Reverse rotation: counted down (*2) | PEB terminal |

*1: Normal rotation means that the pulse input to the PEB terminal when the pulse input to the PEA terminal rises is at a logical high level.
*2: Reverse rotation means the pulse input to the PEB terminal when the pulse input to the PEA terminal rises is at a logical low level.

Bits 9 to 4 are used to set the frequency multiplication factor used in the process conducted by the pulse preprocessing unit 109. That is, bits 5 and 4, constituting a MP0 portion 203, are used to set the frequency multiplication factor for the pulses input to the channel 0, bits 7 and 6, constituting a MP1 portion 204, are used to set the frequency multiplication factor for the pulses input to the channel 1, and bits 9 and 8, constituting a MP2 portion 205, are used to set the frequency multiplication factor for the pulses input to the channel 2. Examples of the frequency multiplication factors that can be set are 1, 2 and 4, as shown in Table 2.

Bit 3, constituting a TCLK portion 206, is used to set the frequency demultiplication factor. In this embodiment, 1 and ½ can be used as the frequency demultiplication factor, as shown in Table 3.

TABLE 2

| Code allocation for MP0 to 2 | | |
|---|---|---|
| Upper bit | Lower bit | Frequency multiplication factor |
| 0 | 0 | ×1 |
| 0 | 1 | ×2 |
| 1 | 0 | ×2 |
| 1 | 1 | ×4 |

TABLE 3

| Code allocation for TCLK | |
|---|---|
| Bit | Frequency demultiplication factor |
| 0 | ×1 |
| 0 | ×½ |

Figure 3:
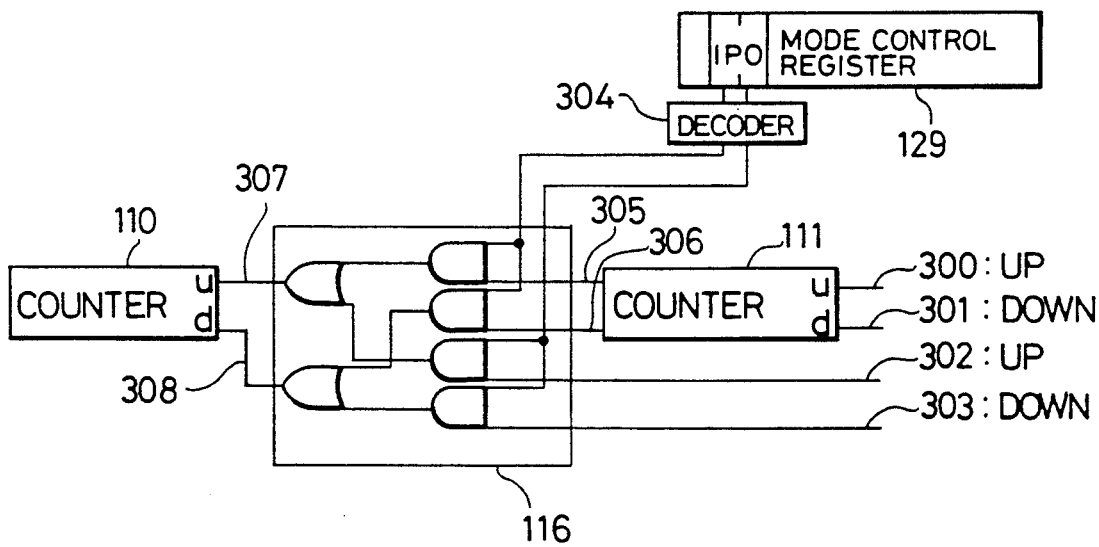
FIG. 3 is a block diagram of an example of a circuit which implements the function of coupling counters PREG.

FIG. 3 is a block diagram of an example of a circuit configuration which implements the counter coupling function. Here, coupling of the counters 110 and 111 will be described. An instruction indicating coupling or non-coupling of the counters 110 and 111 is set in the mode control register 129. That instruction is converted into a control signal by a decoder 304.

When the counters are coupled, a carry signal 305 or a borrow signal 306 generated as a consequence of the counting operation of the counter 111 by either a counting up or counting down signal 300 or 301 output from the pulse preprocessing unit 109 is used as either a counting up or down signal 307 or 308 for the counter 110.

When the counters are operated separately, a counting up or counting down signal 302 or 303, which are output from the pulse preprocessing unit 109 to the counter PREG0A110, is supplied to the counter 110 through the coupling control circuit 116 as the counting up or counting down signal 307 or 308 without being changed. Coupling and separation of other counters are performed in the same manner.

Figure 4:
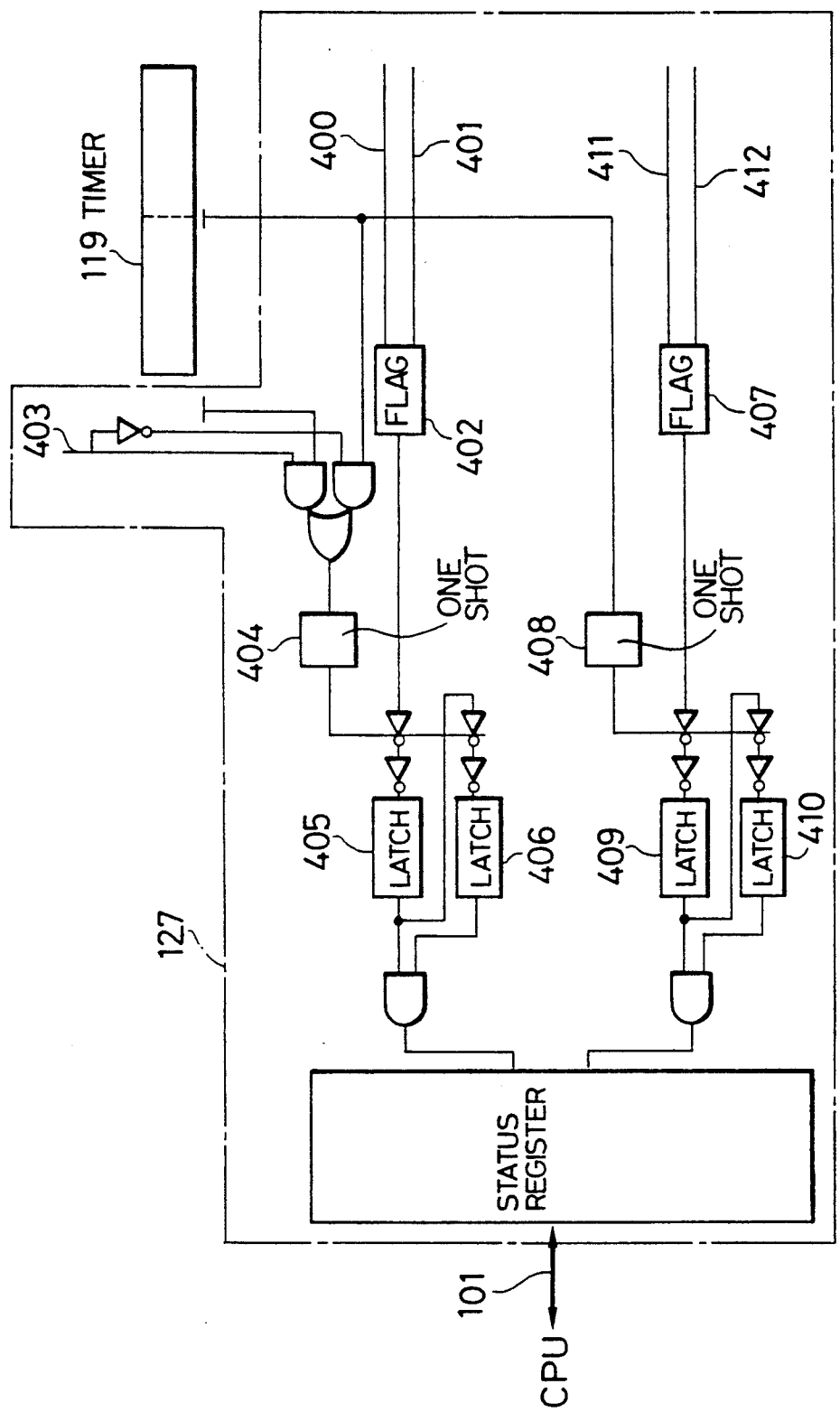
FIG. 4 is a block diagram of an example of a circuit for detecting that an overflow condition of a timer 119 has occurred twice or more before a subsequent reading-out of a latch TREG.

FIG. 4 is a block diagram of an example of a detection circuit 127 for detecting that an overflow condition of the timer 119 has occurred twice or more in the latch reading-out intervals of latches 121 to 126.

An overflow condition of the timer 119 is detected by a 32-bit carry of the counter when the counters are coupled with each other and by a bit state of bit 17 of timer 119 when the counters are separated from each other.

Regarding a latch on the A side, determination is first made whether the counters are coupled with or separated from each other from a coupling output 403, and then a one-shot overflow signal is generated by a one-shot circuit 404. Non-update flag 402 is set by a read-out signal 400 of the microcomputer, and reset by an update signal 401 of the corresponding latch TREGA. Therefore, when the flag 402 stored in a latch 405 by the overflow signal has a value 1, it indicates that an overflow condition has occurred after the A side latch is updated. A latch 406 stores the value of the latch 405 by the overflow signal. Consequently, a logical AND between the latches 405 and 406 represents the generation of an overflow condition twice or more, and the status register of the overflow status detecting unit 127 thus reflects the results of this logical operation.

Regarding a latch on the B side, a one-shot overflow signal is generated by a one-shot circuit 408 in accordance with the bit state of bit 17 of timer 119. Thereafter, substantially the same operation as that regarding the latch on the A side is conducted so that a non-update flag 407 can be set by a reading-out signal of the microcomputer 411 and an update signal 412 of the B side latch. Generation of an overflow condition twice or more is detected by the latches 409 and 410, and the status register of the overflow status detecting unit 127 thus reflects the results of the detection.

Figure 5:
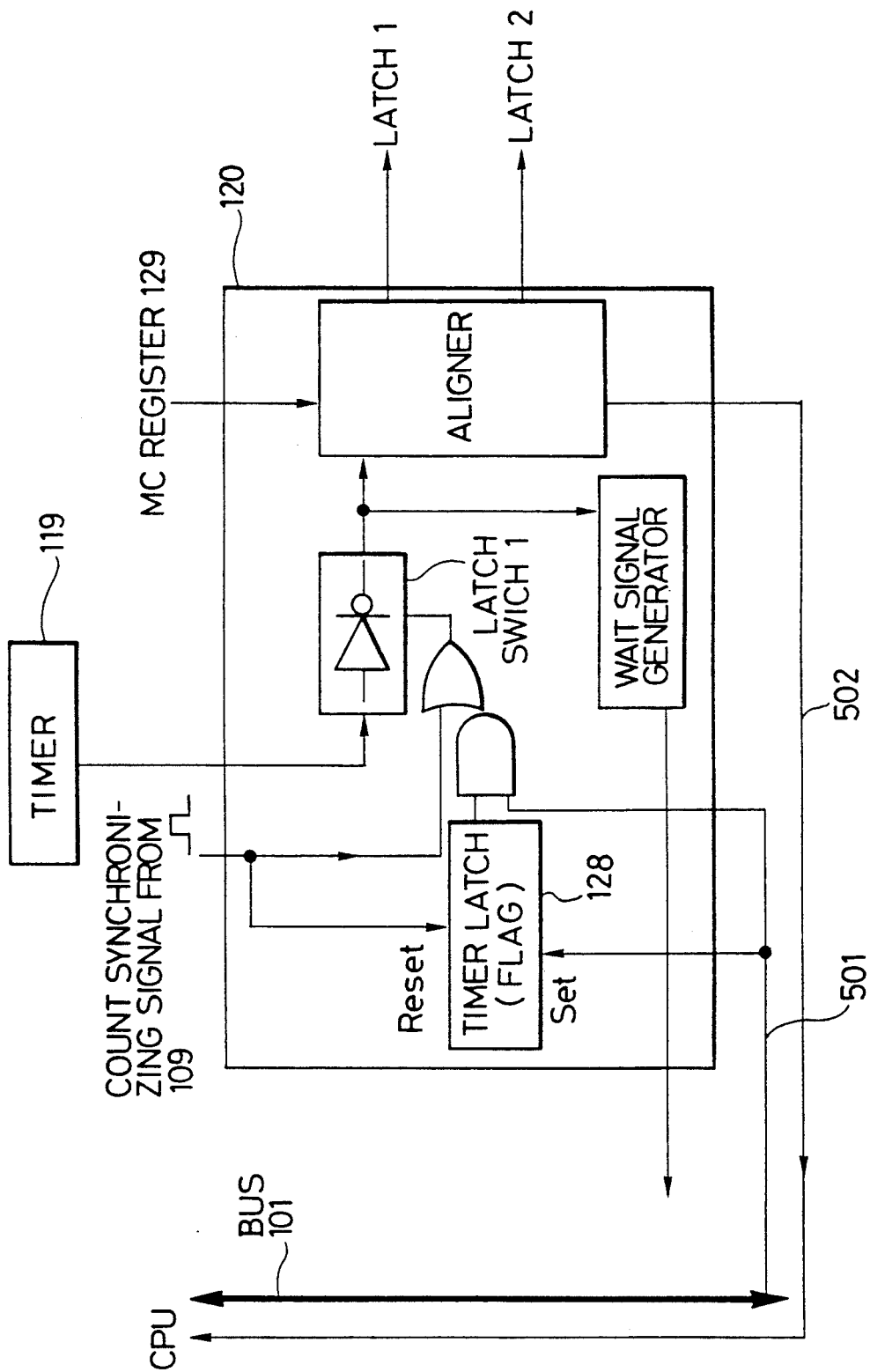
FIG. 5 is a block diagram of an example of a storing latch selecting unit 120 associated with a microcomputer's reading out of the value of the timer 119 which is effective for speed operation when $\Delta MA = 0$.
Figure 6:
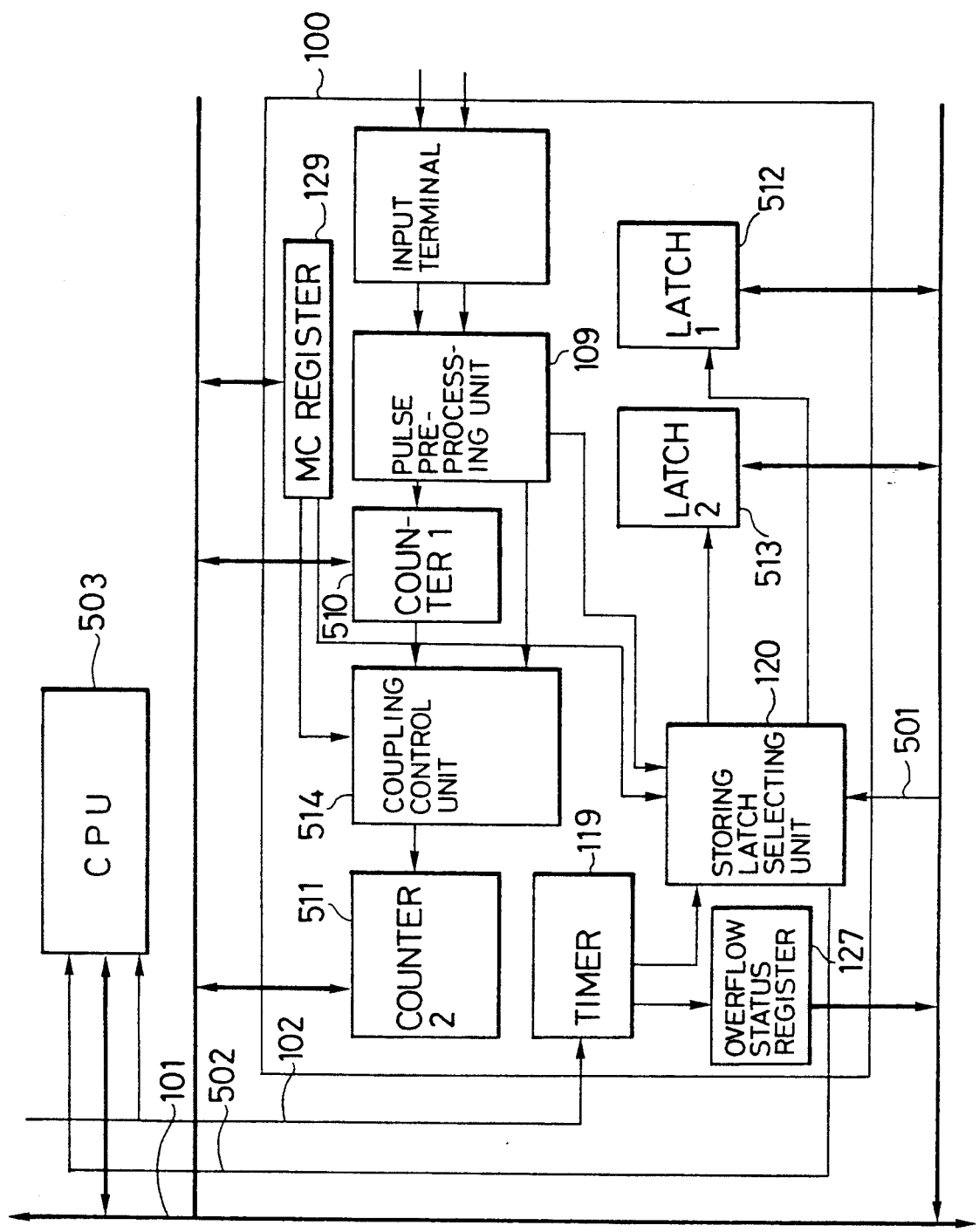
FIG. 6 shows an example of a general-purpose microcomputer in which a digital pulse processing device according to the present invention is incorporated.

FIG. 5 is a block diagram of an example of the storing latch selecting unit 120 associated with reading-out of the value of the timer 119 by the microcomputer which is effective to operate the speed when δMA=0.

The basic function of the storing latch selecting unit 120 is to store the data of the timer 119 in the latch corresponding to the counter designated by the mode control register 129 each time the counter counts the input pulse. That is, the storing latch selecting unit 120 opens a latch switch in response to the count synchronizing signal sent from the pulse preprocessing unit 109 to send the data of the timer 119 to an aligner which distributes the timer data between latches 1 and 2 in accordance with the data from the mode control register 129.

Another function of the storing latch selecting unit 120 is to reduce generation of errors when no count pulse is input in the CPU's data reading out intervals, i.e., when the motor or the like is rotating at a low speed. This function is executed by a read-out signal 501 from the CPU and a signal from the timer latch (flag) 128.

In this case, the timer latch 128 has another function. That is, although the fundamental function of the timer latch 128 is to store the data of the timer 119 when the motor or the like is rotating at a low speed, the timer latch 128 also serves as a flag used to determine whether the motor or the like is rotating at a high or low speed relative to the CPU's reading-out intervals. This flag is set by the read-out signal 501 from the CPU and is reset each time the counting operation is conducted. Therefore, the flag is in a reset state when the counting operation is conducted before a CPU's subsequent reading-out while it is in a set state when no counting operation is conducted. When the flag is in a reset state, it is therefore determined that the motor or the like is rotating at a high speed. When the flag is in a set state, it is determined that the motor or the like is rotating at a low speed. In the latter case, the data on the timer 119 is transferred to the aligner synchronously with the reading-out signal of the CPU and then stored in the latch designated by the mode control register 129.

Thus, generation of errors is prevented during the low-speed rotation. A wait signal 502 indicates that the data stored in the latch is not defined. This wait signal 502 is output only for a period of time corresponding to several clock pulses immediately after the latch switch is operated. The CPU confirms that no wait signal 502 is output when it reads in the timer latch 128, and then obtains the value of the timer 119.

In this embodiment, since the microcomputer reads out the counted value of the free-running counter for counting the clock pulses synchronously with the counting operation of the counter for counting the pulses of the pulse output device, the burden on the software for the speed detection operation can be alleviated.

In this embodiment, a digital pulse processing device provided separately from the CPU has been described. However, a combination of the pulse processing unit 100, serving as a digital pulse processing device according to the present invention, and a CPU 503 may be fabricated as a one-chip microcomputer.

As will be understood from the foregoing description, since the counters for counting the pulses from the pulse output device are coupled with or separated from each other to change the precision of the data output from the counters, counting of a wider range can be made possible. This allows pulse processing at a precision suitable to the application to be made possible.

Furthermore, since an overflow condition of the free-running counter for counting the clock pulses can be detected in response to the coupling or separation of the counters for counting the pulses of the pulse output device, the operations required for speed detection can be executed accurately using the obtained data.

Furthermore, since the microcomputer reads out the counted value of the free-running counter for counting the clock pulses synchronously with the counting operation of the counter for counting the pulses of the pulse output device, the burden on the software for the speed detection operation can be alleviated.

What is claimed is:
1. A digital pulse processing device, comprising:
   a first counter group including at least first and second counters for counting pulses output from at least one of a first pulse generator and a second pulse generator; and
   coupling control means connected to said first and second counters for changing over an operation mode of said first counter group between a first operation mode in which said first and second counters are in a coupled state so as to operate as a single counter to count the output from said first pulse generator and a second operation mode in which said first and second counters operate individually to count the output of said first and second pulse generators.

2. A digital pulse processing device, comprising:
a first counter group including at least first and second counters for counting pulses output from at least one of a first pulse generator and a second pulse generator;
coupling control means connected to said first and second counters for changing over an operation mode of said first counter group between a fist operation mode in which said first and second counters are in a coupled state so as to operate as a single counter to count the output from said first pulse generator and a second operation mode in which said first and second counters operate individually to count the output of said first and second pulse generators;
a second counter group for counting clock pulses having a higher frequency than the pulses output from said first and second pulse generators;
a latch group including latches corresponding to said second counters, said latch group holding a value output from said second counter group; and
storing latch selection means for determining whether the output value of said second counter is held in a latch in response to said second operation mode of said first counter group or held in said latches in response to said first operation mode of said first counter group.

3. A digital pulse processing device according to claim 2, further comprising overflow detection means for detecting an overflow condition of said second counter in said first latch or said first and second latches from a state of said first latch or said first and second latches corresponding to an operation of said first counter.

4. A digital pulse processing device according to claim 2, wherein a pulse counting circuit including said second counter and said latches further includes latch control means for storing a value of said second counter by a read-in instruction to a latch from a microcomputer, for outputting a wait signal to said microcomputer until a value of said second counter is defined, and for outputting data to said microcomputer from said second counter synchronously with operation of said second counter.

5. A digital pulse processing device according to claim 3, wherein a pulse counting circuit including said second counter group and said latches further includes latch control means for storing a value of said second counter by a read-in instruction to a latch from a microcomputer, for outputting a wait signal to said microcomputer until a value of said second counter is defined, and for outputting data to said microcomputer from said second counters synchronously with operation of said second counters.

6. A digital pulse processing device according to claim 2, further comprising a pulse preprocessing unit having two pulse input terminals, said pulse preprocessing unit including means for selecting either counting of one or two single-phase pulses, counting of two-phase pulses having a directional component or counting of an input made up of a single pulse train and a signal for designating a counting process of the single pulse train.

7. A digital pulse processing device according to claim 3, further comprising a pulse preprocessing unit having two pulse input terminals, said pulse preprocessing unit selecting either counting of one or two single-phase pulses, counting of two-phase pulses having a directional component or counting of an input made up of a single pulse train and a signal for designating a counting process of the single pulse train.

8. A digital pulse processing device according to claim 4, further comprising a pulse preprocessing unit having two pulse input terminals, said pulse preprocessing unit selecting either counting of one or two single-phase pulses, counting of two-phase pulses having a directional component or counting of an input made up of a single pulse train and a signal for designating a counting process of the single pulse train.

9. A digital pulse processing device according to claim 5, further comprising a pulse preprocessing unit having two pulse input terminals, said pulse preprocessing unit selecting either counting of one or two single-phase pulses, counting of two-phase pulses having a directional component or counting of an input made up of a single pulse train and a signal for designating a counting process of the single pulse train.

10. A microcomputer comprising:
a digital pulse processing device and a microprocessor both formed on a same substrate and connected with each other through a system bus, said digital pulse processing device including a first counter group having at least one counter for counting pulses output from a pulse generator, and coupling control means for changing over operation of said first counter group between a first mode of operation of a sole counter of said counter group and a second mode of operation of a plurality of counters of said first counter group in a coupled state.

11. A microcomputer comprising:
a digital pulse processing device and microprocessor both formed on a same substrate and connected with each other through a system bus, said digital pulse processing device including a first counter group including at least one counter for counting pulses output from a pulse generator, coupling control means for changing over operation of said first counter group between a first mode of operation of a sole counter of said first counter group and a second mode of operation of a plurality of counters of said first counter group in a coupled state, a second counter group for counting clock pulses having a higher frequency than pulses output from said pulse generator, a latch group having a same number of latches as the number of counters in said second counter group, said latch group holding a value output from said second counter group, and storing latch selection means for determining whether an output value of said second counter group is to be held in a sole latch in said latch group in response to said first mode of operation of a sole counter in said first counter group or whether said output value is to be held in a same number of latches coupled in said latch group in response to said second mode of operation of a plurality of coupled counters in said first counter group as the number of counters coupled in said first counter group.

12. A microcomputer according to claim 11, further comprising overflow detection means for detecting an overflow condition of said second counter in said first latch or said first and second latches from a state of said first latch or said first and second latches corresponding to an operation of said first counter group.

13. A microcomputer according to claim 11, wherein a pulse counting circuit including said second counter group and said latches further includes latch control means for storing a value of said second counter group by a read-in instruction to a latch from a microcomputer, for outputting a wait signal to said microcomputer until a value of said second counter group is defined, and for outputting data to said microcomputer from said second counters synchronously with operation of said second counter group.

14. A microcomputer according to claim 12, wherein a pulse counting circuit including said second counter group and said latches further includes latch control means for storing a value of said second counter by a read-in instruction to a latch from a microcomputer, for outputting a wait signal to said microcomputer until a value of said second counter group is defined, and for outputting data to said microcomputer from said second counters synchronously with operation of said second counter group.

15. A microcomputer according to claim 11, further comprising a pulse preprocessing unit having two pulse input terminals, said pulse preprocessing unit including mean for selecting either counting of one or two single-phase pulses, counting of two-phase pulses having a directional component or counting of an input made up of a single pulse train and a signal for designating a counting process of the signal pulse train.

16. A microcomputer according to claim 12, further comprising a pulse preprocessing unit having two pulse input terminals, said pulse preprocessing unit including mean for selecting either counting of one or two single-phase pulses, counting of two-phase pulses having a directional component or counting of the input made up of a single pulse train and a signal for designating a counting method process of the single pulse train.

17. A microcomputer according to claim 13, further comprising a pulse preprocessing unit having two pulse input terminals, said pulse preprocessing unit including means for selecting either counting of one or two single-phase pulses, counting of two-phase pulses having a directional component or counting of an input made up of a single pulse train and a signal for designating the counting method of the single pulse train.

18. A microcomputer according to claim 14, further comprising a pulse preprocessing unit having two pulse input terminals, said pulse preprocessing unit including means for selecting either counting of one or two single-phase pulses, counting of two-phase pulses having a directional component or counting of an input made up of a single pulse train and a signal for designating a counting process of the single pulse train.

19. A digital pulse processing device, comprising:
a first counter for counting pulses output from a first pulse generator;
a selector coupled to said first counter for selecting carry signals output from said first counter or pulses output from a second pulse generator; and
a second counter coupled to said selector for counting pulses output from said selector.

20. A digital pulse processing device, comprising:
a first counter for counting pulses output from a first pulse generator;
a selector coupled to said first counter for selecting carry signals output from said first counter or pulses output from a second pulse generator;
a second counter coupled to said selector for counting pulses output from said selector;
a timer for counting clock pulses having a higher frequency than the pulses output from said first and second pulse generators;
a first latch and a second latch each having half of a bit length of said timer; and
a second selector for storing upper bit signals of said timer in said first latch and for storing lower bit signals of said timer in said second latch when said first selector selects said carry signal output from said first counter, and for storing said lower bit signals of said timer in said first latch and said second latch when said first selector selects said pulses output from said second pulse generator.

* * * * *